Z. ROGERS.
Cotton and Corn Planters.
No. 151,161. Patented May 19, 1874.
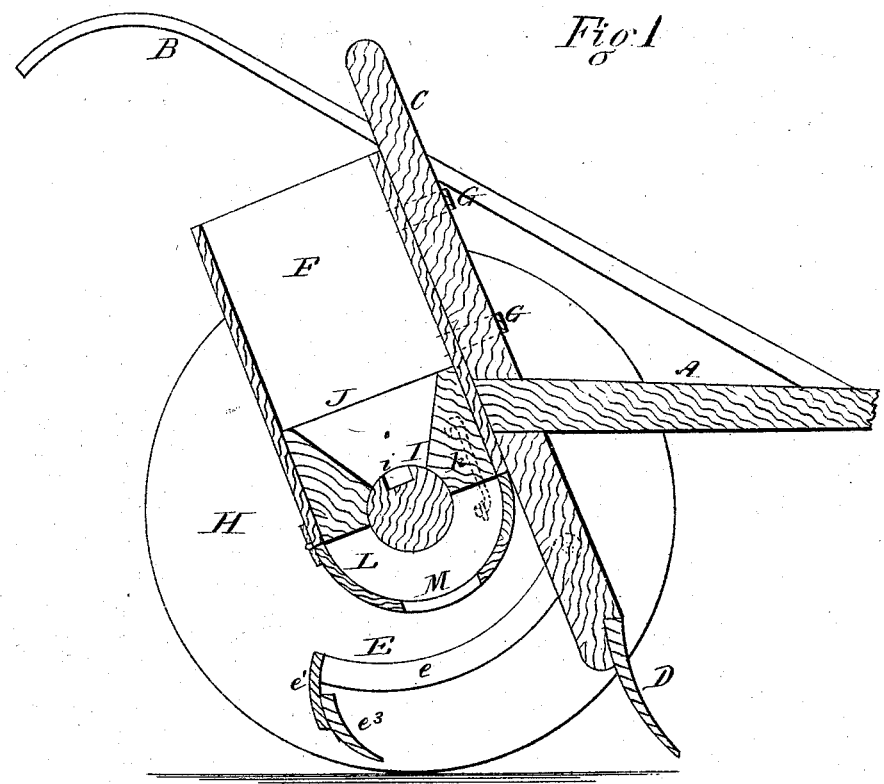
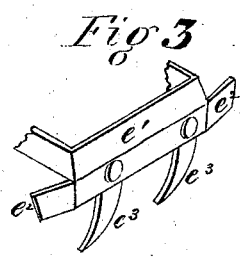
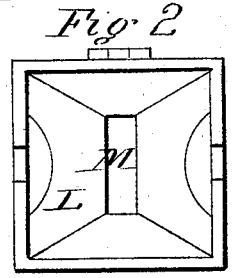
WITNESSES.
J. P. Connolly
E. Connolly
INVENTOR,
Zachariah Rogers
By Connolly Bros
Attorneys.

UNITED STATES PATENT OFFICE.

ZACHARIAH ROGERS, OF TUSKEGEE, ALABAMA.

IMPROVEMENT IN COTTON AND CORN PLANTERS.

Specification forming part of Letters Patent No. 151,161, dated May 19, 1874; application filed June 7, 1873.

*To all whom it may concern:*

Be it known that I, ZACHARIAH ROGERS, of Tuskegee, in the county of Macon and State of Alabama, have invented a Combined Corn and Cotton Planter, of which the following is a specification, reference being had to the accompanying drawings, in which—

Figure 1 is a vertical sectional view of my invention, and Figs. 2 and 3 are details.

This invention has relation to a combined corn and cotton planter; and it consists in the novel construction of parts, as hereinafter described, whereby the seed-box is adapted to the reception, interchangeably, of corn and cotton dropping cylinders; also, in the construction and novel arrangement of a pivoted or hinged coverer, all as hereinafter specified.

Referring to the accompanying drawings, A designates the draft-beam, B the handles, C the standard, and D the shovel, of a plow of simple construction, adapted to the formation of furrows for the reception of corn or cotton-seed. E designates the coverer, having two arms bent from a single bar of metal, and hinged or pivoted to the sides of the standard, so that the coverer may rise and fall to correspond to the inequalities of the surface over which the implement passes. The arms $e$ are connected at their rear ends by a transverse bar, $e^1$, formed from the same bar, and provided with ears $e^2$, bent inwardly, as shown, to convey the earth toward the center of the hill from the sides. The bar $e^1$ is also provided with curved teeth $e^3$, to break the clods and pulverize the earth forming the hills. The arms $e$ are curved, as shown, so as not to be obstructed in their movements by the bottom of the seed-box, which is made convex, as shown. F designates said seed-box, attached to the standard C by means of loops G, which loosely include the standard, thereby enabling the plow and box to rise and fall independently, and thereby adapt themselves to the inequalities of the surface. The box rests upon the axle, which passes through its lower portion, and is at once the axle and seed-cylinder, the middle portion, which is contained within the box, being enlarged and provided with seed-cups, or otherwise constructed to deposit seed.

The implement is adapted to use as a corn or cotton planter by having a hinged bottom, upon the edges of which the axle rests. The bottom is upheld by hooks or equivalent fastenings $k$, and may be let down to allow one cylinder to be removed and another substituted therefor. The bottom has an opening in the center for the passage of seed, and toward said opening the sides of the bottom incline on the inside to prevent seed from lodging in corners.

When the implement is used in planting corn, a hopper, J, consisting of a rectangular block, having a funnel-shaped central opening, should be inserted in the seed-box and allowed to rest lightly on the cylinder, as shown in Fig. 1.

Having fully described my invention, what I claim as new, and desire to secure by Letters Patent, is—

1. In a corn and cotton planter, the combination of the adjustable seed-box H, hinged semi-cylindrical bottom L, hooks $k$, internal removable hopper J, detachable combined seed-cylinder and axle, and driving-wheels, all as shown and described.

2. In a wheel-planter having an adjustable seed-box supported upon the axle, and coupled by loops to the plow-standard in front, the coverer having curved arms pivoted to said standard, and thence projecting rearwardly underneath and behind the seed-box, all combined substantially as shown and described.

In testimony that I claim the foregoing I have hereunto set my hand this 30th day of April, 1873.

ZACHARIAH ROGERS.

Witnesses:
WM. GEO. BREWER,
W. C. BREWER.